United States Patent [19]

Drummond

[11] Patent Number: 5,392,886
[45] Date of Patent: Feb. 28, 1995

[54] LIQUID COOLED SHOCK ABSORBER

[76] Inventor: Jameson M. Drummond, 21 Reid Street, Wodonga, Victoria 3690, Australia

[21] Appl. No.: 66,064
[22] PCT Filed: Oct. 8, 1991
[86] PCT No.: PCT/AU91/00461
    § 371 Date: May 28, 1993
    § 102(e) Date: May 28, 1993
[87] PCT Pub. No.: WO92/09823
    PCT Pub. Date: Jun. 11, 1992

[30] Foreign Application Priority Data

Nov. 30, 1990 [AU] Australia .................. PK3627

[51] Int. Cl.⁶ ............................................. F16F 9/42
[52] U.S. Cl. ........................... 188/322.19; 188/264 D
[58] Field of Search .......... 188/264 D, 264 R, 322.19, 188/274, 315, 269; 60/456; 92/169.1, 171.1

[56] References Cited

U.S. PATENT DOCUMENTS

| | | | |
|---|---|---|---|
| 2,576,658 | 11/1951 | Werner ...................... | 188/274 |
| 2,862,120 | 11/1958 | Onsrud ...................... | 310/54 |
| 3,530,965 | 9/1970 | Wilson ...................... | 192/113 SP |
| 3,795,291 | 3/1974 | Naito et al. ................ | 188/315 X |
| 4,616,810 | 10/1986 | Richardson et al. ........ | 267/218 |

FOREIGN PATENT DOCUMENTS

| | | | |
|---|---|---|---|
| 1144380 | 10/1957 | France . | |
| 2640339 | 6/1990 | France . | |
| 893762 | 9/1953 | Germany . | |
| 2456002 | 7/1975 | Germany ............... | 188/315 |
| 805705 | 12/1958 | United Kingdom . | |
| 737255 | 5/1980 | U.S.S.R. ................ | 188/274 |

*Primary Examiner*—Robert J. Oberleitner
*Assistant Examiner*—Alfred Muratori
*Attorney, Agent, or Firm*—Vorys, Sater, Seymour and Pease

[57] ABSTRACT

A liquid cooled shock absorber unit for a vehicle having an outer cylinder surrounding a shock absorber cartridge forming an annular chamber connected to a source of liquid coolant through a plurality of coolant delivery tubes extending through the annular chamber so as to provide an even circulation of the coolant fluid through the annular chamber and to act as reinforcing strengthening members for the unit. The shock absorber unit is connected in a liquid cooling system separate from the vehicle engine cooling system.

7 Claims, 2 Drawing Sheets

LIQUID COOLED SHOCK ABSORBER

FIELD OF THE INVENTION

This invention relates to liquid cooled tubular shock absorbers and more particularly, but not exclusively, to shock absorbers of the hydraulic, gas, or friction type for use in road or rail vehicles, or aircraft. Although not limited thereto, the present invention has particular advantageous application to gas filled shock absorbers of the Bilstein gas type McPherson strut cartridge and the De Carbon principle struts or shock absorbers.

BACKGROUND OF THE INVENTION

A well known problem associated with telescopic shock absorbers employing a damping piston reciprocating in a cylinder filled with a damping gas and/or fluid is the temperature dependent damping characteristics of the shock absorber.

The capacity of such shock absorbers to operate efficiently is limited in certain conditions of operation by their inability to dissipate heat resulting from fluid friction converting the undesirable kinetic energy of the vibrating mass into heat causing thermal overloading.

Generally an increase in the temperature of the damping fluid adversely affects the damping characteristics of the shock absorber. When a vehicle travels over rough terrain or on a racing circuit the rapid reciprocative axial movement of the damping piston causes the temperature of the damping fluid to rise rapidly and this can be exacerbated when the ambient temperature is relatively high and the vehicle is being operated at high speed.

U.S. Pat. No. 4,616,810 discloses a liquid cooled shock absorber employing a jacket which surrounds the damping chamber of the shock absorber and forms an annular outer chamber. Cooling fluid enters the annular chamber through a narrow, axially extending inlet passage open at the lower end of the annular chamber to allow circulation of the fluid around the remaining main portion of the annular chamber and thence through an outlet connection. The annular outer chamber is connected for fluid communication with the cooling system of the vehicle engine.

The shock absorber of this patent suffers from the disadvantages of lack of uniform distribution of the cooling liquid around the shock absorber cartridge and the lack of strength in the system in that the jacket and its shock absorber cartridge are subject to distortion due to the unequal cooling, and that being linked into the engine cooling system the temperatures therein required for efficient running of the vehicle engine are in the region of 80° C. to 100° C. In this situation with temperatures at the shock absorber in the vicinity of 100° C. the strength of the shock absorber drops by approximately one third of its static strength.

It is an object of the present invention to stabilize the temperature of a shock absorber for consistent and efficient damping and to prevent the shock absorber reaching high temperatures over 100° C. which can result in seal breakdown and high piston and bore wear distortion of the shock absorber cartridge. As the temperature of the shock absorber increases, the oil viscosity decreases whereby the damping effect is reduced and piston speeds increase resulting in excessive wear on the piston and its cylinder wall.

It is a further object of the present invention to provide a cooling system for a shock absorber incorporating a coolant casing around the shock absorber cartridge which greatly increases the strength of the shock absorber assembly and this is particularly advantageous in motor sport applications.

Yet another object of the present invention is the provision of a cooling system for a shock absorber which is independent of the vehicle engine cooling system wherein the engine coolant is too hot in most cases to maintain optimum operating temperatures for the shock absorbers and obviates any pipeline or shock absorber failure which could cause loss of engine coolant and serious engine damage.

SUMMARY OF THE INVENTION

According to the invention there is provided a shock absorber unit for a vehicle comprising a tubular shock absorber encased in an outer cylinder providing an annular space between the outer surface of the shock absorber and the inner surface of the outer cylinder, a first closure cap mounted on one end of the outer cylinder and secured to an end of the shock absorber, a second closure cap mounted on the other end of the outer cylinder so as to concentrically locate the other end of the shock absorber and its piston rod, said first closure cap including an annular liquid distribution chamber adapted to be connected to a source of liquid coolant and having an outlet duct therein separate from the remainder of said annular chamber and open to said annular space, said annular chamber having connected thereto a plurality of coolant delivery tubes extending substantially the full length of said annular space.

In order to provide additional strength to the unit the delivery tubes engage against the outer surface of the shock absorber and the inner surface of the outer cylinder in a close sliding fit.

According to a further feature of the invention there is provided a shock absorber liquid cooling system comprising a radiator connect to the outlet of the shock absorber unit of the invention, a reservoir connected to the radiator and a circulating pump connected between the reservoir and the shock absorber unit through a flow control valve.

The system may have manual or electronic controls for ensuring optimum control of the temperature of the shock absorber unit.

In order that the invention and its manner of performance may be more fully understood, reference will now be made to an embodiment of the invention as illustrated in the accompanying drawings, in which:

FIG. 3 is a sectional plan view of the unit taken along the line 3—3 of FIG. 2.

DESCRIPTION OF THE PREFERRED EMBODIMENTS

Figure 1:
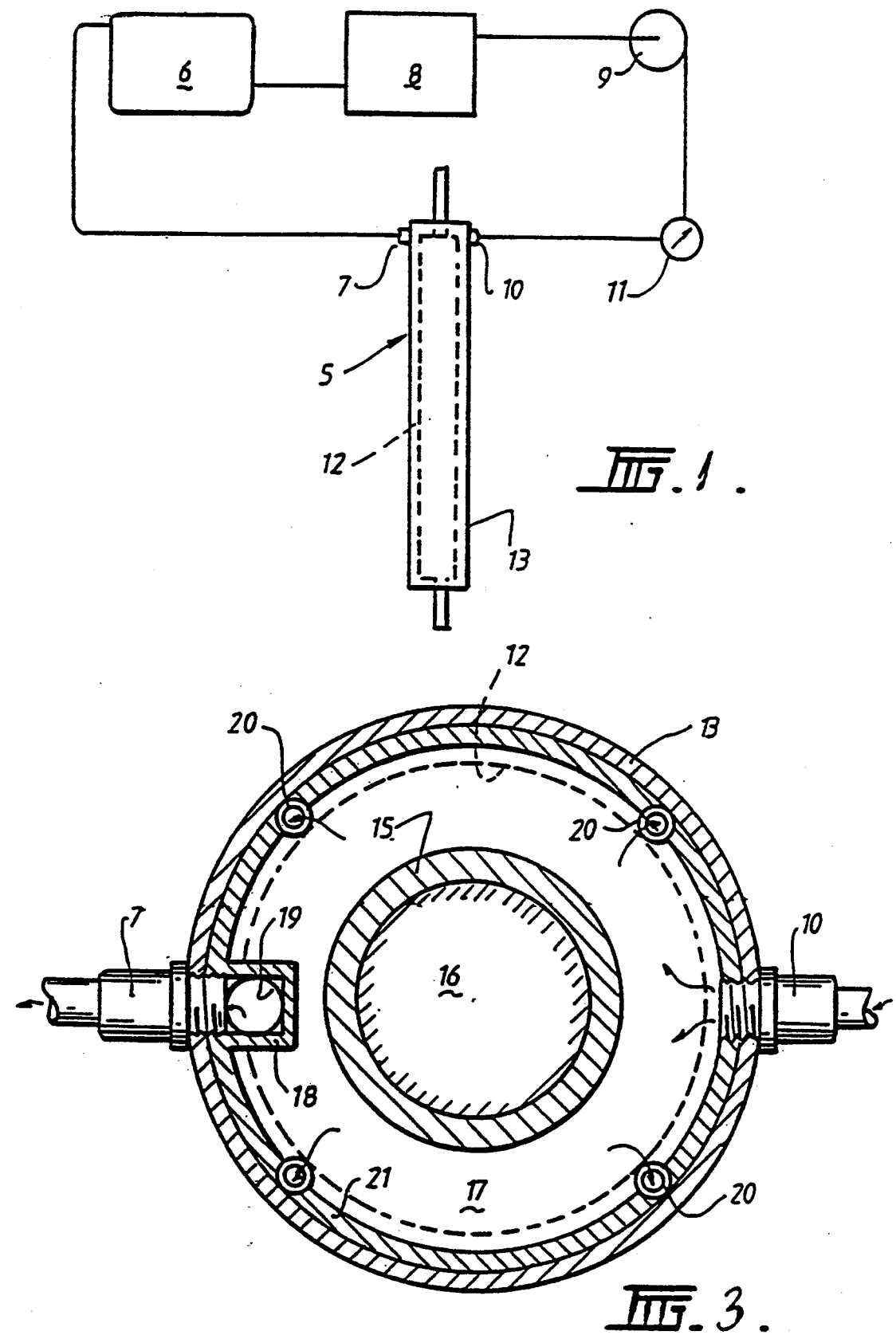
FIG. 1 is a schematic layout of the system of the invention.

Referring to the drawings, the coolant circulating system of FIG. 1 includes a shock absorber unit 5 of the invention, a radiator 6 connected to the outlet 7 of the unit 5, a reservoir 8 connected between radiator 6 and a, preferably electrically driven circulating pump 9 in turn connected to the inlet 10 of the unit 5 through a flow control valve 11.

Figure 2:
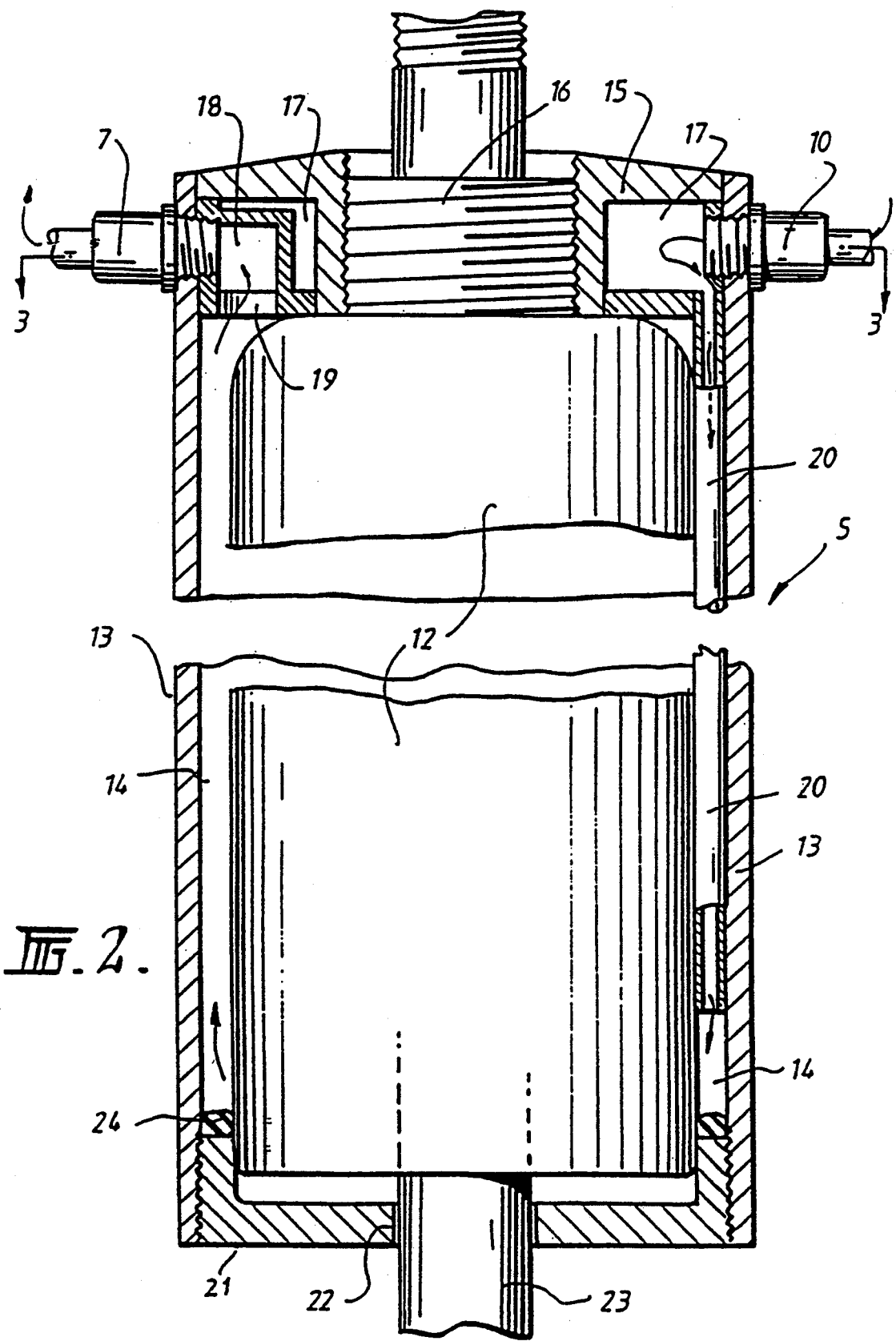
FIG. 2 is a part-sectional side elevation of the shock absorber unit of the invention.

The shock absorber unit 5 as illustrated in FIGS. 2 and 3 comprises a known shock absorber 12 such as a Bilstein (Trade Mark) gas pressure type absorber. Shock absorber 12 is encased in an outer cylinder 13 generally concentric with unit 5 and forming an annular chamber 14 surrounding shock absorber 12.

At the upper end of cylinder 13, as shown in FIG. 2 there is secured a closure cap 15 to which the upper end of shock absorber 12 is screw-threadedly connected at 16. Closure cap 15 includes an annular liquid distribution chamber 17 having a single outlet duct 18 therein separate and remote from the remainder of chamber 17, said duct 18 being open at 19 to the upper end of chamber 14 and connected to the outlet 7.

Diametrically opposite outlet 7 there is located on closure cap 15 an inlet 10 in communication with annular distribution chamber 17.

Connected to and depending from annular chamber 17 are a plurality of circumferentially spaced liquid coolant distribution tubes 20 extending into the annular chamber 14 and terminating adjacent the lower end of the chamber 14. Distribution tubes 20 firmly but slidingly engage between the outer surface of shock absorber 12 and the inner surface of cylinder 13 so as to act as reinforcing members and provide stability and additional strength to unit 5 which is particularly advantageous in motor sport applications.

At the lower end of cylinder 13 there is located a cup shaped closure cap 21 which acts to centralize the lower end of shock absorber 12 and has a centrally located aperture 22 with a suitable guide bush for piston rod 23 of shock absorber 12. An O-ring sealing member 24 is located on the inner end of closure cap 21 to prevent passage of coolant fluid from said annular space 14 into the closure cap 21.

By extending distribution tubes 20 into the annular chamber 14 there is ensured optimum and uniform circulation of the coolant fluid and low operating temperatures of the shock absorber even under heavy load operating conditions resulting in a high level of damping efficiency and suspension control with minimum wear of the shock absorber parts.

Test results on a dyno test bed on the shock absorber system of the present invention compared with a conventional non-cooled shock absorber are set out below:

| Time | Water cooled shock absorber temp. | Radiator temp. | Reservoir temp. | Shock absorber temp. without cooling |
|---|---|---|---|---|
| Start-without fan on radiator | 18° C. | 17° C. | 17° C. | 18° C. |
| After 3 mins. | 19° C. | 21° C. | 20° C. | 49° C. |
| After 6 mins. | 21° C. | 21° C. | 23° C. | 70° C. |
| After 9 mins. | 23° C. | 25° C. | 24° C. | 86° C. |
| After 12 mins. | 23° C. | 25° C. | 24° C. | 96° C. |
| After 15 mins. | 29° C. | 29° C. | 28° C. | 108° C. |
| After 18 mins. with fan operating for 3 mins. | 29° C. | 29° C. | 24° C. | 124° C. |

Reading taken after 26 minutes showed no change in the temperature of the water cooled shock absorber of the invention being stabilized at 29° C.

Temperature data compiled during an Australian Alpine Rally held in April, 1991 on a Mazda GT-X 4WD vehicle fitted with liquid cooled shock absorbers according to the present invention over a 30 kilometer special stage noted for being extremely hard on suspension gave the following Centigrade temperature readings at the radiators of both the front pair of shock absorbers and the rear pair of shock absorbers:

DATA TAKEN FROM START OF SPECIAL STAGE 14 OVER 30 KILOMETRES TEMPERATURES TAKEN AT RADIATORS. AMBIENT TEMP. 22 DEG. C.

| REC | Time | FNT IN | OUT | REAR IN | OUT |
|---|---|---|---|---|---|
| REC:327 | 11:10:13 | FNT IN 30.9 | OUT 26 | REAR IN 27.8 | OUT 23.9 |
| REC:328 | 11:10:46 | FNT IN 30.9 | OUT 27 | REAR IN 27.8 | OUT 24.9 |
| REC:329 | 11:11:19 | FNT IN 32 | OUT 27 | REAR IN 27.8 | OUT 24.9 |
| REC:330 | 11:11:51 | FNT IN 32 | OUT 27.8 | REAR IN 28.8 | OUT 26 |
| REC:331 | 11:12:24 | FNT IN 32 | OUT 28.8 | REAR IN 28.8 | OUT 26 |
| REC:332 | 11:12:57 | FNT IN 32 | OUT 27.8 | REAR IN 28.8 | OUT 26 |
| REC:333 | 11:13:30 | FNT IN 32 | OUT 28.8 | REAR IN 28.8 | OUT 26 |
| REC:334 | 11:14:4 | FNT IN 32 | OUT 27.8 | REAR IN 28.8 | OUT 26 |
| REC:335 | 11:14:36 | FNT IN 32 | OUT 27.8 | REAR IN 28.8 | OUT 24.9 |
| REC:336 | 11:15:0 | FNT IN 32 | OUT 27.8 | REAR IN 29.9 | OUT 24.9 |
| REC:337 | 11:15:43 | FNT IN 33 | OUT 27.8 | REAR IN 29.9 | OUT 26 |
| REC:338 | 11:16:15 | FNT IN 33 | OUT 28.8 | REAR IN 29.9 | OUT 27 |
| RFC:339 | 11:16:48 | FNT IN 34.1 | OUT 28.8 | REAR IN 30.9 | OUT 27 |
| REC:340 | 11:17:21 | FNT IN 35.1 | OUT 29.9 | REAR IN 32 | OUT 27 |
| REC:341 | 11:17:53 | FNT IN 35.1 | OUT 28.8 | REAR IN 32 | OUT 27 |
| REC:342 | 11:18:26 | FNT IN 35.9 | OUT 29.9 | REAR IN 32 | OUT 27.8 |
| REC:343 | 11:18:59 | FNT IN 35.1 | OUT 33 | REAR IN 33 | OUT 28.8 |
| RFC:344 | 11:19:31 | FNT IN 36.9 | OUT 33 | REAR IN 35.1 | OUT 29.9 |
| REC:345 | 11:20:5 | FNT IN 37.9 | OUT 34.1 | REAR IN 35.1 | OUT 30.9 |
| REC:346 | 11:20:38 | FNT IN 40.9 | OUT 35.1 | REAR IN 35.9 | OUT 30.9 |
| REC:347 | 11:21:12 | FNT IN 40.9 | OUT 35.9 | REAR IN 36.9 | OUT 33 |
| REC:348 | 11:21:45 | FNT IN 40.9 | OUT 36.9 | REAR IN 38.9 | OUT 34.1 |
| REC:349 | 11:22:18 | FNT IN 42.9 | OUT 37.9 | REAR IN 38.9 | OUT 35.1 |
| REC:350 | 11:22:51 | FNT IN 42.9 | OUT 37.9 | REAR IN 38.9 | OUT 33 |
| REC:351 | 11:23:24 | FNT IN 42.9 | OUT 36.9 | REAR IN 39.9 | OUT 34.1 |
| REC:352 | 11:23:57 | FNT IN 42.9 | OUT 36.9 | REAR IN 39.9 | OUT 34.1 |
| REC:353 | 11:24:30 | FNT IN 42.9 | OUT 38.9 | REAR IN 39.9 | OUT 36 |
| CAR STOPPED IN CONTROL END OF SPECIAL STAGE | | | | | |
| REC:354 | 11:25:4 | FNT IN 42.9 | OUT 39.9 | REAR IN 39.9 | OUT 39.9 |
| REC:355 | 11:25:37 | FNT IN 42.9 | OUT 41.9 | REAR IN 40.9 | OUT 40.9 |
| REC:356 | 11:26:11 | FNT IN 43.9 | OUT 42.9 | REAR IN 41.9 | OUT 41.9 |
| REC:357 | 11:26:44 | FNT IN 44.9 | OUT 43.9 | REAR IN 41.9 | OUT 41.9 |
| REC:358 | 11:27:17 | FNT IN 45.9 | OUT 44.9 | REAR IN 42.9 | OUT 42.9 |
| REC:359 | 11:27:50 | FNT IN 46.9 | OUT 44.9 | REAR IN 43.9 | OUT 44.9 |

-continued

DATA TAKEN FROM START OF SPECIAL STAGE 14 OVER 30
KILOMETRES TEMPERATURES TAKEN AT RADIATORS. AMBIENT
TEMP. 22 DEG. C.

| REC:360 | 11:28:23 | FNT | IN | 46.9 | OUT | 45.9 | REAR | IN | 44.9 | OUT | 44.9 |
|---|---|---|---|---|---|---|---|---|---|---|---|
| REC:361 | 11:28:56 | FNT | IN | 47.9 | OUT | 46.9 | REAR | IN | 45.9 | OUT | 45.9 |
| REC:363 | 11:30:3 | FNT | IN | 41.9 | OUT | 36.9 | REAR | IN | 39.9 | OUT | 35.9* |

*CAR MOVING: TEMPERATURES DROP IMMEDIATELY

The temperature readings taken on the shock absorber shafts at the end of special stage 14 for the Mazda GT-X with liquid cooled shock absorbers were on average 43° C. and stable, whereas on another vehicle with conventional non-liquid cooled shock absorbers the average temperature reading was 150° C. and rising.

The present invention can be advantageously, but not exclusively, used with the above-mentioned manufacturers struts or shock absorbers wherein these types of struts operate in a unique manner whereby the cartridge piston rod is connected to the base of the strut body with the larger section damper tube acting as the top link. In the case of a rear shock absorber the same cartridge which is used in the McPherson strut may be inverted and mounted to replace a conventional telescopic shock absorber.

In the present invention the cooling system is fully dedicated so as to dissipate the large amount of heat generated from shock absorber guide bearings and damping forces experienced. Engine coolant is normally too hot to maintain optimum operating temperatures of the shock absorbers and any piping or shock absorber failure could cause loss of engine coolant and serious engine damage.

It is desirable, but not essential that each front or rear set of shock absorbers of the present invention in a vehicle be serviced by one dedicated coolant system.

The coolant circulation pump and optional electronic controls may be mounted inside a vehicle cabin or engine bay.

I claim:

1. A shock absorber unit for a vehicle comprising a tubular shock absorber encased in an outer cylinder providing an annular space between an outer surface of the shock absorber and an inner surface of the outer cylinder, a first closure cap mounted on one end of the outer cylinder and secured to an end of the shock absorber, a second closure cap mounted on the other end of the outer cylinder so as to concentrically locate the other end of the shock absorber and a piston rod cooperating therewith, said first closure cap including an annular liquid distribution chamber adapted to be connected to a source of liquid coolant and having an outlet duct therein separate from a remainder of said annular chamber and open to the annular space, said annular chamber having connected thereto a plurality of coolant delivery tubes, circumferentially spaced apart in the annular space between the shock absorber and said outer cylinder and extending substantially the full length of the annular space, and wherein said coolant delivery tubes engage against the outer surface of the shock absorber and the inner surface of the outer cylinder so as to act as reinforcing strengthening members for said unit.

2. A shock absorber unit according to claim 1 and including a sealing ring located on the inner end of said second closure cap to prevent passage of the liquid coolant from the annular space into said second closure cap.

3. A shock absorber unit according to any one of claims 1 or 2, further comprising a liquid cooling system comprising a radiator connected between the outlet duct of said unit and a coolant liquid reservoir and a coolant liquid circulating pump connected between the reservoir and the annular liquid distribution chamber of said unit through a flow control valve.

4. A shock absorber unit according to claim 3, wherein the vehicle has a vehicle engine cooling system, said liquid cooling system being independent of the vehicle engine cooling system.

5. A shock absorber unit according to claim 3 further including manual or electronic means to control the circulation of fluid through the liquid cooling system in accordance with the temperature of the coolant liquid to ensure optimum control of the temperature of the shock absorber unit.

6. A shock absorber unit according to claim 3 wherein the liquid cooling system includes and services a front set of shock absorber units of the vehicle.

7. A shock absorber unit according to claim 3 wherein the liquid cooling system includes and services a rear set of shock absorber units of the vehicle.

* * * * *